Feb. 17, 1953 W. P. ATKINSON ET AL 2,628,815
FAIRLEAD FOR SEMITRAILER SCRAPERS OR WAGONS
Filed April 16, 1948 2 SHEETS—SHEET 1
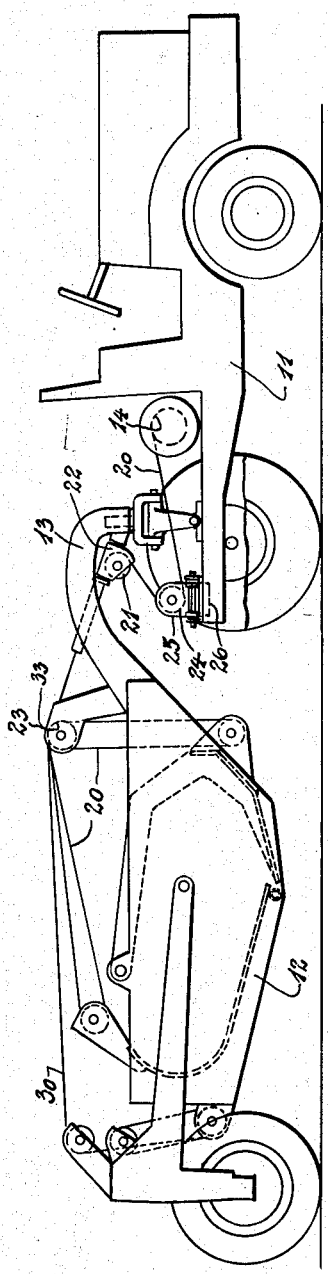
INVENTORS,
WILLIAM P. ATKINSON,
TREVOR O. DAVIDSON,
BY
ATTORNEY.

Feb. 17, 1953 W. P. ATKINSON ET AL 2,628,815
FAIRLEAD FOR SEMITRAILER SCRAPERS OR WAGONS
Filed April 16, 1948 2 SHEETS—SHEET 2

WILLIAM P. ATKINSON,
TREVOR O. DAVIDSON,
INVENTORS.

BY Roger Sherman Hoar

ATTORNEY.

Patented Feb. 17, 1953

2,628,815

UNITED STATES PATENT OFFICE 2,628,815

FAIRLEAD FOR SEMITRAILER SCRAPERS OR WAGONS

William P. Atkinson, South Milwaukee, and Trevor O. Davidson, Milwaukee, Wis., assignors to Bucyrus-Erie Company, South Milwaukee, Wis., a corporation of Delaware Application April 16, 1948, Serial No. 21,454

17 Claims. (Cl. 254—190)

Our invention relates to new and useful improvements in fairleads; and more particularly in fairleads to lead the control ropes from the towing vehicle, past the joint between that vehicle and the towed instrumentality, to the towed instrumentality; and still more particularly when the towing vehicle is a tractor, and the towed instrumentality is a semi-trailer dirtmoving scraper or wagon.

The joint between a towing tractor and a towed semi-trailer scraper or wagon is usually universal, so as to accommodate the irregularity of the ground over which such combinations usually operate. Adjacent this juncture, a fairlead guides control ropes, usually two in number, from the tractor to the trailer, the fairlead comprising trains of swivelled sheaves so arranged that the ropes will not interfere with relative motion of the two vehicles. In this connection two problems arise. First, slackening one of the control ropes, as frequently happens during operation, may leave one or more of the swivelled sheaves, over which the slack rope passes, free to swing out of their proper plane, causing the rope to jump the sheave and the sheave and/or rope to interfere with the other rope or with other parts of the vehicles. Secondly, if to obviate the first difficulty, corresponding sheaves for the two ropes are paired so that they swing parallel to each other, rope wear is introduced, since the planes of the two ropes are not exactly parallel for all relative positions of the two vehicles.

Accordingly it is the principal object of our invention to provide a fairlead such that, regardless of the relative motion of the two vehicles, each sheave will lie in the plane of its rope whenever such rope is taut and substantially in such plane whenever its rope is slack, thereby reducing rope wear to a minimum and preventing interference between ropes, sheaves, and any parts of the vehicles.

In addition to the objects above stated, we have worked out a number of novel and useful details, which will be readily evident as the description progresses.

Our invention consists in the novel parts, and in the combination and arrangement thereof, which are defined in the appended claims, and of which two embodiments are exemplified in the accompanying drawings, which are hereinafter particularly described and explained.

Throughout the description, the same reference number is applied to the same member or to similar members.

Referring now to the accompanying drawings, it will be seen that:

Figure 1 is a side elevation, somewhat conventionalized, of a tractor and semi-trailer scraper, equipped with our fairlead.

Figure 2 is an en enlarged side elevation of our fairlead and of the adjacent joint between tractor and trailer, partly in section.

Figure 3 is an enlarged rear view, partly in section taken along the line 3—3 of Figure 2.

Figure 4:
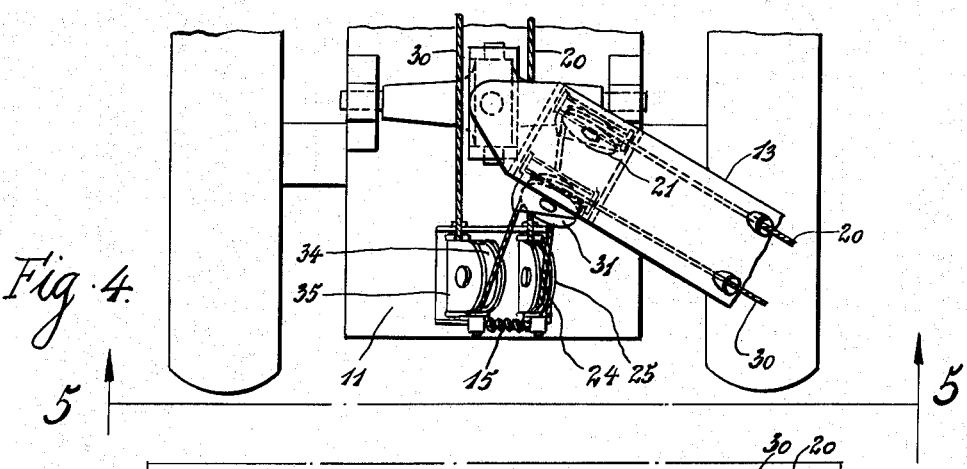
Figure 4 is an enlarged plan view, taken along the line 4—4 of Figure 5, showing the fairlead when the trailer is turned relative to the tractor.

Referring now to Figure 1, we see that 11 is a conventionalized representation of a tractor, and that 12 is slightly conventionalized representation of a semi-trailer scraper of the general type exemplified by U. S. Patent No. 2,321,410 to Mork and Baranowski. The gooseneck 13 of the scraper 12 is universally attached to the tractor 11. Two control ropes 20, 30 pass from two-drum winch 14 on the tractor 11, over sheaves which will be hereinafter explained, to the various controlled mechanisms of the scraper.

Turning now to Figures 2 and 3, it will be noted that our fairlead consists of two pairs of swivelled sheaves, which will now be described.

Upper sheaves 21, 31, rotate in sheave frames 22, 32 which are mounted on scraper gooseneck 13 to swivel about slightly inclined, longitudinal, parallel, laterally spaced axes leading in the direction of guide sheaves 23, 33 respectively on the scraper.

Lower sheaves 24, 34, rotate in sheave frames 25, 35, which are mounted below sheaves 21, 31, on the rear end of tractor 11, to swivel about horizontal, longitudinal, parallel, laterally spaced axes leading in the direction of winch 14 on the tractor.

Rope 20 passes from winch 14 (see Figure 1), under lower fairlead sheave 24, over upper fairlead sheave 21 over guide sheave 23, and thence to the parts of the scraper 12 to be controlled thereby.

Rope 30 passes similarly from winch 14, under lower fairlead sheave 34, over upper fairlead sheave 31, over guide sheave 33, and thence to the parts of the scraper to be controlled thereby.

For ready distinguishment in the claims, we shall call 11 the "first member," and 13 the "second member," sheaves 24, 34 "longitudinal sheaves mounted on the first member," and sheaves 21, 31 "longitudinal sheaves mounted on the second member."

Counterweights 26, 36, attached to frames 25, 35 respectively below their swivel axes serve to fix the center of gravity of each sheave assembly slightly below its swivel axis and counteract any tendency of sheaves 24, 34, to fall to one side when ropes 20, 30 are slack.

Figure 5:
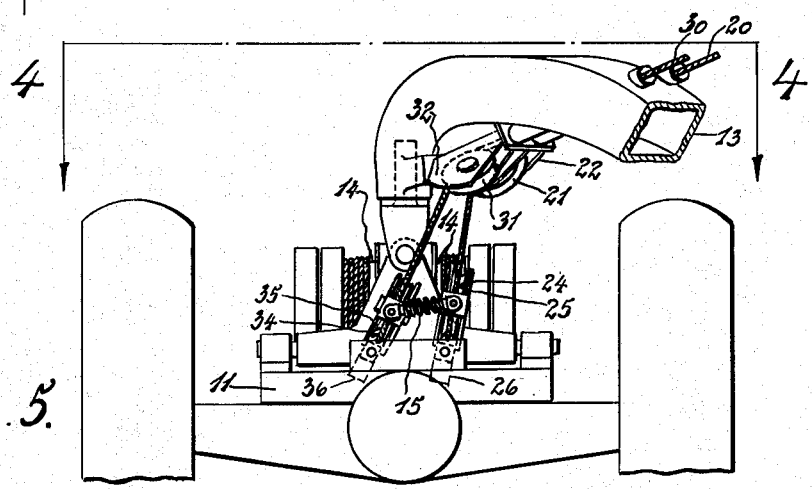
Figure 5 is an enlarged rear elevation taken along the line 5—5 of Figure 4.

Sheave frames 25, 35 are connected laterally by resilient link 15 which maintains the sheaves 24, 34 in parallel planes. Accordingly, when one control rope is slack, as frequently happens, its sheave will be supported in approximately the plane of that rope by the other sheave which is held in position by the other taut control rope. Only when the scraper gooseneck is swung far to one side of the tractor for a sharp turn (as in Figures 4 and 5), will planes of control ropes 20, 30 at lower sheaves 24, 34 not be approximately parallel, the plane of the outside rope 30 being more inclined than the inside rope 20. When both ropes are taut, the resilience of link 15 allows the sheaves 25, 35 to remain in the planes of their respective ropes as their relative inclination changes with relative turning movement of the tractor and trailer, thereby preventing rope wear that would otherwise occur if the link 15 was of fixed length. Accordingly, the maximum departure of either sheave from the plane of its rope is the small difference in inclination of the two ropes for extreme turning movement of the tractor and trailer; and even this departure occurs only when one of the control ropes is slack.

Although we have shown our resilient link between the lower pair of sheaves 24, 34, of our fairlead, these being more apt to leave their proper plane, the same link can if desired likewise be employed between the upper sheaves 21, 31, as shown dotted in Figure 3, with similar results.

Figures 6, 7:
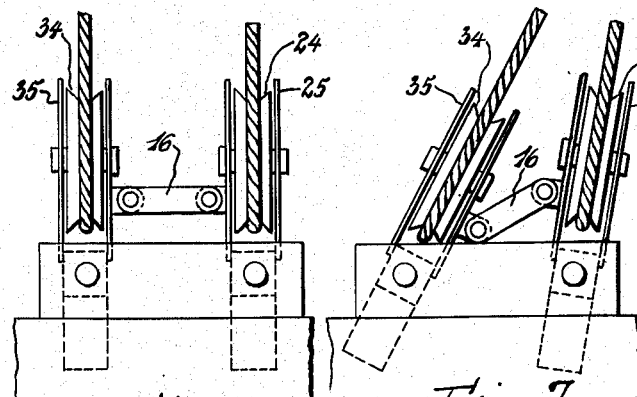
Figure 6 is a further enlarged rear elevation, similar to a portion of Figure 3, showing a second embodiment of our invention.
Figure 7 is a further enlarged rear elevation, similar to a portion of Figure 5, showing the second embodiment of our invention.

Turning now to Figures 6 and 7, we see that, as the second embodiment of our invention, we can substitute for the resilient link 15, a rigid link 16, of such length and so positioned relative to the swivel axes of the sheaves, that when the vehicle turns and the sheaves incline to one side, the outer sheave 34 inclines at a greater angle from the vertical than the inner sheave 24. When the link 16 is connected between the sheave frames 25, 35 on the same side of the swivel axes as the sheaves 24, 34, it will be seen that the link must be shorter than the spacing of the swivel axes to accomplish such a result. See Figure 7. Although this construction is preferable to connecting the link on the opposite side of the swivel axes, since then the link would not only have to be longer than the space between the swivel axes, to produce the desired difference in inclination of the sheaves, but would generally interfere with the mounting of the sheave frames, it is not essential.

Having now described and illustrated two forms of our invention, we wish it to be understood that our invention is not to be limited to the specific form or arrangement of parts herein described and shown.

We claim:

1. In a fairlead, the combination of: a first member; a second member swivelly connected thereto; two transversely spaced trains of sheaves, the sheaves of each train being lined up for the successive passage of a rope; a block for the first longitudinal sheave in each train, swivelly mounted on the first member; a block for the second longitudinal sheave, in each train, swivelly mounted on the second member; and a transverse tension-compression link pivotally connecting the blocks of the longitudinally sheaves mounted on one of said members to maintain these sheaves in transversely spaced relation, the pivotal axes of the link and the swivel axes of the blocks being substantially parallel.

2. A fairlead according to claim 1, further characterized by the fact that when one of the two blocks is perpendicular to the plane of the swivel axes of the two blocks, the link will be of such length that the other of the two blocks will likewise be perpendicular to that plane.

3. A fairlead according to claim 1, further characterized by the fact that the link is resilient, and that the sheave-blocks are so located, proportioned, and swivelled, and the link is so proportioned and connected to the sheave-blocks, that the link is under load when the first member is swivelled, at an angle relative to the second member, and permits the first and second longitudinal sheaves of each train to be constrained by rope tension to inclination in the planes of their respective ropes.

4. A fairlead according to claim 1, further characterized by the fact that the sheaves in the sheave-blocks to which the link is connected are normally coaxial.

5. A fairlead according to claim 1, further characterized by the fact that each of the sheave-blocks to which the link is connected swivels about a substantially horizontal longitudinal axis.

6. A fairlead according to claim 5, further characterized by the fact that the center of gravity of each sheave-block lies beyond its swivel axis from the sheave, whereby each block normally assumes a vertical position.

7. A fairlead according to claim 1, further characterized by having a second tension-compression link pivotally connecting the blocks of the longitudinal sheaves mounted on the other of said members.

8. A fairlead according to claim 7, further characterized by the fact that the sheaves in the sheave-blocks to which the second link is connected are normally coaxial.

9. In a fairlead, the combination of: a first member; a second member swivelly connected thereto; a pair of normally coaxial transversely-spaced longitudinal sheaves; sheave-blocks for these two sheaves, swivelly mounted on one of said members; and a tension-compression link pivotally connecting the blocks of said sheaves whereby the sheaves are maintained in transversely-spaced relation, the pivotal axes of the link and the swivel axes of the blocks being substantially parallel.

10. A fairlead according to claim 9, further characterized by the fact that when one of the two blocks is perpendicular to the plane of the swivel axes of the two blocks, the link will be of such length that the other of the two blocks will likewise be perpendicular to that plane.

11. A fairlead according to claim 9, further characterized by the fact that each sheave-block swivels about a substantially horizontal longitudinal axis, and that the center of gravity of each sheave-block lies beyond its swivel axis from the sheave, whereby each block normally assumes a vertical position.

12. A fairlead according to claim 1, further characterized by the fact that the swivel axes of the two sheave-blocks which are connected by the link are co-planar, and that the link is spaced from the plane of these two axes, and is of materially different length than the distance between these two axes.

13. A fairlead according to claim 12, further characterized by the fact that the link lies on the same side of the swivel axes as do the sheaves, and is materially shorter than the distance between the two swivel axes.

14. A fairlead according to claim 1, further characterized by the fact that the swivel axes of the two sheave-blocks which are connected by the link are co-planar, and that the linkage consisting of the link, the blocks, and the member on which the blocks are swivelled, forms an isosceles trapezoid when the two members are in their normally aligned position, the link and the member constituting the two parallel sides thereof.

15. A fairlead according to claim 9, further characterized by the fact that the swivel axes of the two sheave-blocks which are connected by the link are co-planar, and that the link is spaced from the plane of these two axes, and is of materially different length than the distance between these two axes.

16. A fairlead according to claim 15, further characterized by the fact that the link lies on the same side of the swivel axes as do the sheaves, and is materially shorter than the distance between the two swivel axes.

17. A fairlead according to claim 9, further characterized by the fact that the swivel axes of the two sheave-blocks which are connected by the link are co-planar, and that the linkage consisting of the link, the blocks, and the member on which the blocks are swivelled, forms an isosceles trapezoid when the two members are in their normally-aligned position, the link and the member constituting the two parallel sides thereof.

WILLIAM P. ATKINSON.
TREVOR O. DAVIDSON.

REFERENCES CITED

The following references are of record in the file of this patent:

UNITED STATES PATENTS

| Number | Name | Date |
|---|---|---|
| 1,126,153 | Wotton | Jan. 26, 1915 |
| 1,307,989 | Soule | June 24, 1919 |
| 1,870,690 | Remde | Aug. 9, 1932 |
| 2,383,978 | Le Tourneau | Sept. 4, 1945 |
| 2,414,933 | Daniels | Jan. 28, 1947 |

FOREIGN PATENTS

| Number | Country | Date |
|---|---|---|
| 127,144 | Great Britain | May 29, 1919 |